United States Patent [19]

Horn et al.

[11] Patent Number: 4,838,306

[45] Date of Patent: Jun. 13, 1989

[54] PNEUMATIC LOCKING VALVE WITH MANUAL OVERRIDE

[75] Inventors: Edward R. Horn, Nashotah; Derek Hopkinson, Menomonee Falls, both of Wis.

[73] Assignee: Aladdin Engineering & Mfg., Inc., Brookfield, Wis.

[21] Appl. No.: 83,170

[22] Filed: Aug. 10, 1987

[51] Int. Cl.[4] .................... F16K 15/00; F15B 11/08
[52] U.S. Cl. ...................... 137/522; 91/420; 91/445; 91/447; 137/901
[58] Field of Search ............... 91/420, 445, 446, 444, 91/448, 462; 251/14; 417/305; 137/901, 522

[56] References Cited

U.S. PATENT DOCUMENTS

| 1,146,850 | 7/1915 | Cullum | 137/901 X |
| 2,585,045 | 2/1952 | Schmidlin | 251/14 X |
| 2,728,564 | 12/1955 | Bracke | 251/14 X |
| 3,004,549 | 10/1961 | Temple | 251/14 X |
| 4,072,087 | 2/1978 | Mueller | 91/461 |
| 4,667,570 | 5/1987 | Jensen et al. | 91/420 |

FOREIGN PATENT DOCUMENTS 65403  4/1982  Japan ..................... 91/420

*Primary Examiner*—Edward K. Look
*Attorney, Agent, or Firm*—Michael, Best & Friedrich

[57] ABSTRACT

A locking valve assembly for use with air cylinder and in pneumatic circuits and including a locking valve for selectively locking air pressure in the air cylinder. The locking valve is pilot operated to provide for release of air pressure from the air cylinder and also includes a manual override apparatus for providing for release of the locking valve in the absence of pilot pressure.

1 Claim, 1 Drawing Sheet

PNEUMATIC LOCKING VALVE WITH MANUAL OVERRIDE

FIELD OF THE INVENTION

The invention relates to pneumatically operated cylinders and more particularly to a valve assembly for use in locking air in a pneumatic cylinder, the locking valve assembly including means for manually overriding the locking valve to permit release of air from the locking valve.

BACKGROUND PRIOR ART

A prior art locking valve for use primarily with hydraulic cylinders is illustrated in a catalog titled Hydraulic and Pneumatic Check and Relief Check Valves, published by Kepner Products Company, Villa Park, Ill.. Those prior art locking valves are pilot operated such that release of the locking valves requires application of fluid pressure to a pilot port of the locking valve. Such locking valves do not permit release of the locking valve in the absence of a fluid pressure source.

Attention is also directed to the Kepner U.S. Pat. No. 2,959,188, issued Nov. 8, 1960; the Kepner U.S. Pat. No. 3,335,750, issued Aug. 15, 1967; Kaetterhenry U.S. Pat. No. 4,018,136, issued Apr. 19, 1977; and the Panis U.S. Pat. No. 3,975,987, issued Aug. 24, 1976. Attention is also directed to the Gerulis U.S. Pat. No. 4,192,338, issued Mar. 11, 1980; the Bobnar U.S. Pat. No. 4,172,582, issued Oct. 30, 1979; the Bitonti U.S. Pat. No. 3,980,336, issued Sept. 14, 1976; the Martin U.S. Pat. No. 3,817,154, issued June 18, 1975; the Parrett et al U.S. Pat. No. 3,792,715, issued Feb. 19, 1974; the Reith U.S. Pat. No. 4,531,449, issued July 30, 1985; and the Bingel U.S. Pat. No. 3,229,721 issued Jan. 18, 1966.

SUMMARY OF THE INVENTION

The present invention provides an improved apparatus for providing a means for selectively locking air pressure in an air cylinder in the event of failure of the source of air pressure to the cylinder and including means for providing for convenient manual override of the locking mechanism to permit fluid flow from the cylinder. The apparatus embodying the invention also provides a locking valve configuration and manual override means having a configuration which is economically manufactured and adapted for use in various applications.

More particularly, the invention includes an air cylinder assembly including a cylinder having one end including an advance port and an opposite end including a retract port, a piston housed in the cylinder and supported therein for shiftable movement between an extended position and a retracted position, and means for selectively and alternatively supplying air pressure to the advance port and the retract port of the air cylinder to provide for reciprocal movement of the piston.

The apparatus also includes means for preventing discharge of air fom the advance port of the cylinder in the event of interruption in the supply of air between the air pressure source and the cylinder, the means for preventing discharge including a valve member for selectively blocking flow of air pressure from the cylinder in the event the supply of air pressure is interrupted, and manually operable means for forcing the valve member to a position wherein air pressure is vented from the cylinder.

In one embodiment of the invention the means for selectively locking air in the cylinder includes a valve body having valve bore, a first portion of the valve bore being in communication with the source of air pressure, and a second portion of the valve bore communicating with one end of the cylinder whereby air can be supplied to the cylinder to cause movement of the piston in the first direction, a valve seat between the first portion of the valve bore and the second portion of the valve bore, the valve member selectively engagable with the valve seat, and means for resiliently biasing the valve member against the valve seat to releasably prevent air flow from the air pressure source to the first end of the cylinder.

In one embodiment of the invention means are provided for forcing the valve member away from the valve seat, this structure including a valve cylinder in the valve bore and a plunger housed in the valve cylinder, the plunger being adapted to selectively engage the valve member to force the valve member away from the valve seat, and an opposite end of the plunger comprising a plunger piston, and means for providing fluid communication between the opposite end of the clamp cylinder and the valve cylinder.

In one embodiment of the invention the means for manually forcing the valve member away from the valve seat includes a manually movable override member having one end adapted to engage the plunger to force the plunger into engagement with the valve member to move the valve member away from the valve seat, and an opposite end adjacent to an end of the valve body and adapted to be manually engaged whereby the manually movable member can be forced against the plunger to cause the plunger to move the valve member away from the valve seat.

One of the advantages of the apparatus embodying the invention is that the manually movable override member is recessed so that the plunger is not inadvertantly depressed and the manual override is not readily disabled by the operator.

Various other features and advantages of the invention will be apparent by reference to the following description of a preferred embodiment, from the claims and from the drawings.

Figures 1, 2:
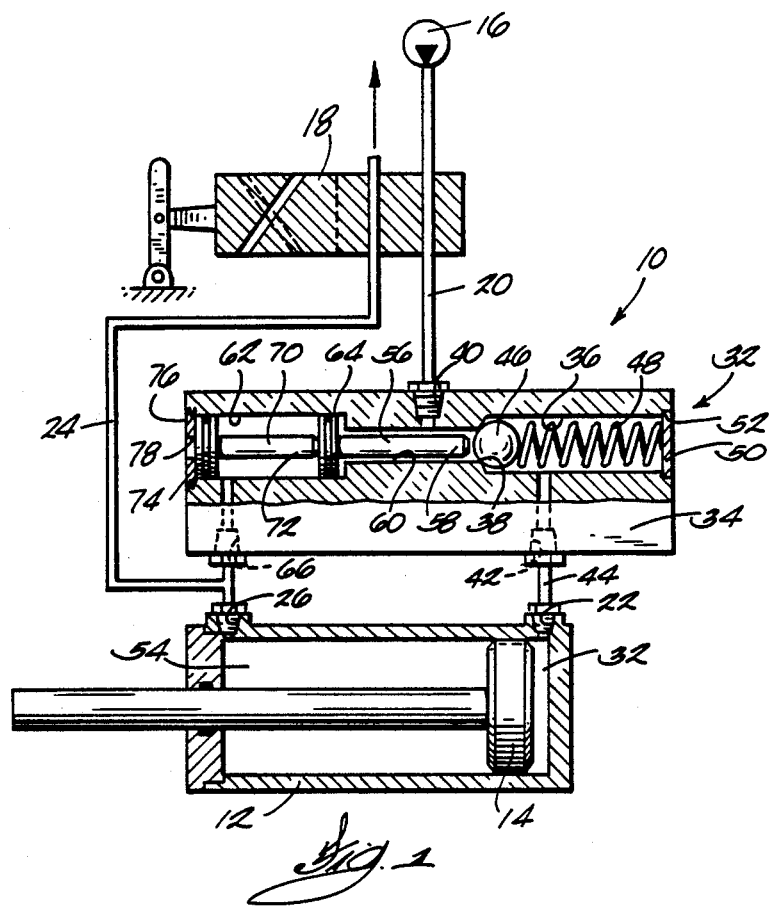
FIG. 1 is a schematic view of a locking valve in a pneumatic circuit including a pneumatic cylinder.
FIG. 2 is an enlarged cross section view of the locking valve illustrated in FIG. 1.

Before describing a preferred embodiment of the invention in detail, it is to be understood that the invention is not limited to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a fluid operated cylinder assembly 10 embodying the invention and including a fluid cylinder 12 housing a piston 14. While it will be appreciated that the cylinder 12 could be a hydraulic cylinder, in the illustrated arrangement, the cylinder assembly is pneumatic. The cylinder assembly further includes a pneumatic pump 16 operably connected through a four-way valve 18 to the cylinder. A fluid line 20 provides for air flow from the valve 18 to an advance port 22 of the cylinder 12 and a fluid line 24 provides for air flow from the valve 18 to the return port 26 of the cylinder.

Also included in the pneumatic circuit is a locking valve assembly 30 operably connected to the ports 22 and 26 of the pneumatic cylinder 12 and functioning to selectively lock air in the advance end 32 of the cylinder 12 and thereby prevent exhaust of air from the advance port 22 in the event of a failure of the source of air pressure supplied to the cylinder 12 as a result of either a failure of the air pump 16, a failure of the control valve 18, or a failure of the air line 20.

The locking valve assembly 30 includes a valve body 34 including a valve bore 36 extending longitudinally through the valve body 34 and having a valve seat 38 intermediate the opposite ends of the valve bore 36. An air inlet port 40 provides fluid communication between the air line 20 and the valve bore 36, and intersects the valve bore on one side of the valve seat 38, and an air pressure supply port 42 intersects the valve bore on an opposite side of the valve seat 38, and is adapted to be connected by an air line 44 to the advance port 22 of the air cylinder 12.

The locking valve assembly 30 also includes a valve member housed in the valve bore and selectively engagable with the valve seat 38 to control fluid flow from the air inlet port 40 through the valve seat 38 to the air supply port 42. While the valve member could have other constructions, in the illustrated arrangement it comprises a ball valve 46. A compression spring 48 is housed in the valve bore 36 and biases the ball 46 against the valve seat 38. The end of the compression spring 48 opposite that end engaging the valve member 46 is supported by a plug 50 fixed in an end 52 of the valve bore 36.

While in the illustrated arrangement, the valve member is shown as comprising a ball valve, in other arrangements the valve member could have other configurations and other conventional seating actions.

The locking valve assembly further includes means for moving the valve member 46 away from the valve seat 38 when air pressure is supplied to the return port 26 of the cylinder 12 and to thereby provide for exhaust of air from the advance side 32 of the cylinder 12 through the valve seat 38, and through the valve seat 38, and through the air line 20 and the control valve 18 to atmosphere. The air pressure in the return side 54 of the cylinder 12 will then cause retraction of the piston. This means for moving the valve member 46 includes a pilot operated plunger 56 having an end 58 housed in a portion 60 of the valve bore and engagable with the valve member 46 to selectively force the valve member 46 away from the valve seat 38.

The end of the valve bore 36 opposite that end including the valve seat defines a cylinder 62, and the end 64 of the pilot operated plunger 56 defines a piston housed in the cylinder 62. The valve body 34 also includes a return air pilot port 66 connected to the return port 26 of the cylinder 12 such that air pressure in the return air line 24 will apply a force on the piston 64 causing the end 58 of the plunger 56 to move into engagement with the valve member 46 to force the valve member 46 away from the valve seat 38.

The apparatus embodying the invention further includes means for permitting manual movement of the valve member 46 away from the valve seat 38 to thereby provided means for manually releasing the pressure in the advance side 32 of the piston 14 in the event of failure of the air pump 16 or other air pressure source and the consequent absence of air pressure in the return air pilot port 66. This means includes a manually movable release pin or plunger 70 housed in the third or cylinder portion 62 of the valve bore 36 and including an end 72 engagable with the piston head 64 of the plunger 56 to cause movement of the plunger 56 into engagement with the valve member 46. The opposite end of the manually movable release pin 70 comprises a piston head 74 housed in the end of the cylinder 62. A piston ring 75 surrounds the piston 74 to provide a fluid tight seal with cylinder 62. Means are also provided in the end of cylinder 62 to restrain the piston from movement to the left as seen in FIG. 1 out of the cylinder. In the illustrated construction this means comprises a plug 76 threaded into the end of the cylinder 62. The plug 76 includes a central hole 78 such that a tool 80 can be inserted through the hole to engage the end of the plunger whereby the plunger can be forced against the valve member to push the valve member away from the valve seat.

Various features of the invention are set forth in the following claims.

We claim:

1. A locking valve assembly for inhibiting the movement of a piston of an air cylinder upon interruption of a source of air pressure supplied to the air cylinder, and wherein the air cylinder includes a first and second ports and slideably houses the piston for movement between extended and retracted positions, and wherein the source of air pressure alternately is supplied to the first and second ports, the locking valve assembly comprising;

a valve body having a valve bore and wherein the valve bore includes a first, second, and third portions, the first portion of the valve bore disposed in fluid communication with the source of air pressure, the second portion of the valve bore disposed in fluid communication with both the first portion of the valve bore and with the first port, and the third portion of the valve bore disposed in fluid communication with both the first portion of the valve bore and with the second port, and a valve seat is positioned between the first and second portions of the valve bore;

a valve member moveably housed in the second portion of the valve bore and selectively engageable with the valve seat;

means for biasing the valve member against the valve seat thereby substantially inhibiting the movement of air from the second portion of valve bore into the first portion of the valve bore;

a plunger moveably housed in the first portion of the valve bore and selectively moveable into and out of engagement with the valve member;

a plunger piston slideably and sealingly housed in the third portion of the valve bore and mounted on the plunger, the plunger piston urging the plunger into engagement with the valve member when the source of air pressure is supplied to the second port thereby urging the valve member away from the valve seat;

a manually moveable release plunger slideably and sealingly mounted in the third portion of valve bore and disposed in force transmitting relation to the plunger piston, the manually moveable release plunger being operable to be manually engaged whereby the release plunger forces the plunger to move the valve member away from the valve seat thereby allowing the movement of air from the second portion of the valve bore to the first portion of the valve bore.

* * * * *